US012781541B2

(12) United States Patent
Lai

(10) Patent No.: US 12,781,541 B2
(45) Date of Patent: Nov. 3, 2026

(54) DUAL UNLOCKING PADLOCK WITH DUAL INDICATORS

(71) Applicant: The Sun Lock Company Limited, Tuen Mun (HK)

(72) Inventor: Karl Lai, Tai Po (HK)

(73) Assignee: The Sun Lock Company Limited, Tuen Mun (HK)

( * ) Notice: Subject to any disclaimer, the term of this patent is extended or adjusted under 35 U.S.C. 154(b) by 0 days.

(21) Appl. No.: 19/061,960

(22) Filed: Feb. 24, 2025

(65) Prior Publication Data

US 2025/0283355 A1 Sep. 11, 2025

Related U.S. Application Data

(60) Provisional application No. 63/563,216, filed on Mar. 8, 2024.

(51) Int. Cl.
*E05B 67/24* (2006.01)
*E05B 67/38* (2006.01)

(52) U.S. Cl.
CPC .............. *E05B 67/24* (2013.01); *E05B 67/38* (2013.01)

(58) Field of Classification Search
CPC .......... E05B 67/24; E05B 67/38; E05B 67/00; E05B 67/22; E05B 67/10; E05B 67/14; E05B 67/08; E05B 37/0034; E05B 37/0058; E05B 37/025; E05B 37/0068; E05B 35/008; E05B 35/105; E05B 39/00; E05B 39/04; E05B 41/00; Y10T 70/48; Y10T 70/7147; Y10T 70/422; Y10T 70/415; Y10T 70/491; Y10T 70/489; Y10T 70/463; Y10T 70/7141; Y10T 70/428; Y10T 70/8027; Y10T 70/478; Y10T 70/827;

(Continued)

(56) References Cited

U.S. PATENT DOCUMENTS

| | | | |
|---|---|---|---|
| 340,427 | A | 4/1886 | De la Hooke |
| 952,291 | A | 3/1910 | Withers |

(Continued)

FOREIGN PATENT DOCUMENTS

| | | | |
|---|---|---|---|
| CN | 108979328 | A | 12/2018 |
| GB | 2451932 | A | 2/2009 |

(Continued)

*Primary Examiner* — Steven A Tullia

(74) *Attorney, Agent, or Firm* — Ware, Fressola, Maguire & Barber LLP

(57) ABSTRACT

The present invention is directed to a padlock including a body configured to house a combination mechanism and a key mechanism, the combination mechanism configured to allow operation of the padlock from a locked mode to an unlocked mode, and the key mechanism configured to allow operation of the padlock from the locked mode to an unlocked mode, a shackle having a short-leg and a long-leg, a key mechanism indicator configured to at least partially extend out of the body of the padlock when the padlock is operated to the unlocked mode by the key mechanism, and a latch configured for operative engagement with the key mechanism indicator to retain the key mechanism indicator at least partially extended out of the body of the padlock until the padlock has been operated from the locked mode to the unlocked mode by the combination mechanism.

19 Claims, 7 Drawing Sheets

(58) Field of Classification Search
CPC ... Y10T 70/7407; Y10T 70/8162; Y10S 70/59
USPC .......................................................... 70/38 R
See application file for complete search history.

(56) References Cited

U.S. PATENT DOCUMENTS

| | | | | | |
|---|---|---|---|---|---|
| 1,993,408 | A | | 3/1935 | Ledin | |
| 2,227,803 | A | | 1/1941 | Bales | |
| 2,793,522 | A | | 5/1957 | Axel | |
| 3,824,819 | A | | 7/1974 | Neary | |
| 4,351,171 | A | | 9/1982 | Tsui | |
| 4,733,548 | A | | 3/1988 | Ling | |
| 5,727,405 | A | | 3/1998 | Cromwell | |
| 6,100,802 | A | | 8/2000 | Adams | |
| 6,176,109 | B1 | | 1/2001 | Tsui | |
| 6,516,643 | B1 | | 2/2003 | Olshausen | |
| 6,792,778 | B1 | | 9/2004 | Chen | |
| 6,860,125 | B1 | | 3/2005 | Yu | |
| 6,877,345 | B1 | * | 4/2005 | Misner | E05B 35/105 70/330 |
| 6,904,776 | B1 | | 6/2005 | Lin | |
| 7,007,521 | B1 | | 3/2006 | Misner et al. | |
| 7,100,401 | B2 | | 9/2006 | Yu | |
| 7,131,299 | B1 | * | 11/2006 | Huang | E05B 37/025 70/284 |
| 7,140,209 | B2 | | 11/2006 | Lai | |
| 7,159,422 | B1 | * | 1/2007 | Misner | E05B 37/025 70/284 |
| 7,216,517 | B2 | * | 5/2007 | Ling | E05B 37/0034 70/284 |
| 7,225,648 | B2 | | 6/2007 | Lai et al. | |
| 7,357,007 | B2 | * | 4/2008 | Lin | E05B 39/00 70/284 |
| 7,363,782 | B1 | * | 4/2008 | Misner | E05B 35/105 70/284 |
| 7,552,607 | B2 | * | 6/2009 | Yang | E05B 67/003 70/432 |
| 7,628,045 | B2 | | 12/2009 | Yu | |
| 7,765,840 | B2 | * | 8/2010 | Lai | E05B 35/105 70/284 |
| 7,832,238 | B2 | * | 11/2010 | Misner | E05B 37/0034 70/432 |
| 8,011,212 | B2 | | 9/2011 | Yu | |
| 8,201,423 | B1 | * | 6/2012 | Misner | E05B 35/105 70/284 |
| 8,353,184 | B2 | * | 1/2013 | Ling | E05B 39/00 70/284 |
| 8,881,558 | B2 | * | 11/2014 | Misner | E05B 37/025 70/284 |
| 9,206,625 | B2 | * | 12/2015 | Lai | E05B 37/025 |
| 9,890,559 | B2 | * | 2/2018 | Lai | E05B 67/22 |
| 9,890,567 | B2 | * | 2/2018 | Yu | E05B 67/06 |
| 10,221,591 | B2 | * | 3/2019 | Lai | E05B 67/24 |
| 10,443,272 | B2 | * | 10/2019 | Lai | E05B 37/0034 |
| 10,626,637 | B2 | * | 4/2020 | Yu | E05B 37/025 |
| 10,890,013 | B2 | * | 1/2021 | Lai | E05B 37/025 |
| 11,346,127 | B2 | * | 5/2022 | Lai | E05B 37/0034 |
| 2002/0088256 | A1 | | 7/2002 | Taylor et al. | |
| 2004/0226324 | A1 | | 11/2004 | Loughlin et al. | |
| 2004/0255624 | A1 | | 12/2004 | Loughlin et al. | |
| 2005/0034492 | A1 | | 2/2005 | Yu | |
| 2005/0039501 | A1 | | 2/2005 | Yu | |
| 2005/0044900 | A1 | | 3/2005 | Yu | |
| 2005/0044901 | A1 | | 3/2005 | Yu | |
| 2005/0044902 | A1 | | 3/2005 | Yu | |
| 2005/0092037 | A1 | | 5/2005 | Meekma et al. | |
| 2005/0262902 | A1 | * | 12/2005 | Ling | E05B 37/025 70/432 |
| 2005/0262903 | A1 | | 12/2005 | Ling et al. | |
| 2006/0137413 | A1 | * | 6/2006 | Yu | E05B 37/025 70/63 |
| 2006/0254325 | A1 | * | 11/2006 | Yu | E05B 39/00 70/21 |
| 2006/0260369 | A1 | | 11/2006 | Lai et al. | |
| 2006/0266084 | A1 | | 11/2006 | Kuo et al. | |
| 2007/0227202 | A1 | * | 10/2007 | Yen | E05B 37/0034 70/21 |
| 2008/0011026 | A1 | * | 1/2008 | Huang | E05B 35/105 70/21 |
| 2008/0098774 | A1 | * | 5/2008 | Huang | E05B 39/00 70/21 |
| 2013/0111958 | A1 | | 5/2013 | Kuo et al. | |
| 2020/0318389 | A1 | | 10/2020 | Luo | |
| 2024/0352767 | A1 | * | 10/2024 | Lai | E05B 67/003 |
| 2025/0223837 | A1 | * | 7/2025 | Lai | E05B 37/0034 |
| 2026/0028855 | A1 | * | 1/2026 | Lai | E05B 37/025 |

FOREIGN PATENT DOCUMENTS

| | | | | | |
|---|---|---|---|---|---|
| TW | I292008 | B | * | 1/2008 | E05B 37/0034 |
| TW | 201122198 | A | | 7/2011 | |
| WO | WO-2018114824 | A1 | * | 6/2018 | E05B 37/0034 |

* cited by examiner

DUAL UNLOCKING PADLOCK WITH DUAL INDICATORS

CROSS-REFERENCE TO RELATED APPLICATION

This application claims priority to U.S. Provisional Appl. No. 63/563,216 filed Mar. 8, 2024, which is hereby incorporated by reference in its entirety.

BACKGROUND OF THE INVENTION

1. Field of the Invention

The present invention generally relates to padlocks, and more particularly to a dual unlocking padlock with a reset indicator which is enclosed in a locking body/housing.

2. Related Art

The combination padlock discussed in U.S. Pat. No. 7,140,209 entitled Padlock with Fully Integrated Dual Locking System, which is hereby incorporated by reference in its entirety, has a dual unlocking mechanism however, the padlock lacks an indication of when the shackle is in an open mode, a closed mode, or a reset mode. Therefore, the new invention seeks to address this issue by providing a padlock having a reset indicator such that the indicator provides a visual indication that the padlock is in the reset mode.

SUMMARY OF THE INVENTION

The new padlock also incorporates a key mechanism to override the combination mechanism like many TSA luggage locks which can let a TSA agent open the lock using the overriding key mechanism. The key mechanism user can open the lock via the key mechanism and a key mechanism indicator will pop upward indicating that the padlock has been opened via the key mechanism. The user can use the combination mechanism to reset the key mechanism indicator by entering the correct combination code of the padlock.

It is an object of the present invention to provide a padlock having a key-mechanism indicator provided therein that indicates the padlock has been opened via a key mechanism, and such key-mechanism indicator provides a visual indication that the padlock has been opened via the key mechanism until the correct combination code for the padlock is entered into a combination mechanism of the padlock such that the key-mechanism indicator cannot be depressed without entering the correct combination code.

It is another object of the present invention to provide a padlock having a recode indicator providing a visual indication as to when the padlock is in a reset mode, the reset mode allowing for resetting/reconfiguring the correct combination code for the combination mechanism of the padlock.

It is still another object of the present invention to provide a padlock so that only one of the key-mechanism indicator or the recode indicator are extended from the body of the padlock at one time.

It is yet another object of the present invention to provide a padlock where activation of the recode indicator may be preceded by resetting of the key-mechanism indicator.

It is another object of the present invention to provide a padlock having a recode/reset protrusion extending from a shackle that is configured for resetting of the key-mechanism indicator and activation of the recode indicator.

It is still another object of the present invention to provide a padlock in which the reset/recode protrusion could be separated into more than one protrusion where the reset protrusion is one protrusion and the recode protrusion is another protrusion.

It is yet another object of the present invention to provide a padlock configured for operation to a reset mode in which the correct combination code for the combination mechanism may be reset and/or reconfigured to a new correct combination code for the combination mechanism, and when the padlock is in the reset mode the user may have both hands free to rotate the dials of the combination mechanism to the new correct combination code.

It is understood that these and other objects may be obtained in accordance with exemplary aspects of the present invention directed to a padlock that may include a body configured to house a combination mechanism and a key mechanism, the combination mechanism configured to allow operation of the padlock from a locked mode to an unlocked mode by the combination mechanism, and the key mechanism configured to allow operation of the padlock from the locked mode to an unlocked mode by the key mechanism.

According to this and other exemplary aspects of the present invention, the padlock may also include a shackle having a short-leg and a long-leg configured for retention in the body and for rectilinear and rotational movement relative to the body of the padlock.

According to this and other exemplary aspects of the present invention, the padlock may also include a key mechanism indicator configured to at least partially extend out of the body of the padlock when the padlock is operated to the unlocked mode by the key mechanism.

According to this and other exemplary aspects of the present invention, the padlock may also include a latch configured for operative engagement with the key mechanism indicator to retain the key mechanism indicator at least partially extended out of the body of the padlock until the padlock has been operated from the locked mode to the unlocked mode by the combination mechanism.

According to this and other exemplary aspects of the present invention, the combination mechanism may include at least one dial having a plurality of indicia thereon, and at least one clutch configured for operative engagement with the at least one dial such that rotation of each of the at least one dial is transferred to the corresponding at least one clutch, each dial of the at least one dial may include a plurality of teeth, and each clutch of the at least one clutch may include an extended fin configured for operative engagement with the plurality of teeth of the corresponding dial from the at least one dial.

According to this and other exemplary aspects of the present invention, the key mechanism may include a cylinder configured for receipt of a correct cut key and a cam configured for operative engagement with the cylinder such that rotation of the cylinder is transferred to the cam, the cam may include a cam slope formed therein, and the padlock further may include a blocking plate having a pin extending therefrom and configured for operative engagement with the cam slope of the cam such that rotational movement of the cam is translated to rectilinear movement of the blocking plate.

According to this and other exemplary aspects of the present invention, the cam further may include a slope-wing extending therefrom, and the key-mechanism indicator may include a spring-loaded area formed on one end thereof, a bottom slope formed on an end of the key-mechanism indicator opposite the spring-loaded area, and a neck formed in the key-mechanism indicator disposed between the spring-loaded area and the bottom slope.

According to this and other exemplary aspects of the present invention, the padlock further may include a key-mechanism indicator spring configured for operative engagement with the spring-loaded area of the key-mechanism indicator to urge the key-mechanism indicator into the body of the padlock, and the slope-wing is configured for operative engagement with the bottom slope of the key-mechanism indicator such that rotation of the cam causes compression of the key-mechanism indicator spring and extension of at least a portion of the key-mechanism indicator out of the body of the padlock.

According to this and other exemplary aspects of the present invention, the latch may include a spring assembled area configured for operative engagement with a latch spring and a tip extending from the spring assembled area, the tip is configured for a retaining engagement with the neck of the key-mechanism indicator so as to maintain extension of at least the portion of the key-mechanism indicator out of the body of the padlock when the padlock is operated to the unlocked mode by the key mechanism.

According to this and other exemplary aspects of the present invention, the padlock may also include a locking hole formed in the body and configured to at least partially surround the short-leg of the shackle when the padlock is in the locked mode, the locking hole has an arcuate opening formed therein configured for receipt of at least a portion of the blocking plate when the padlock is in the locked mode, the blocking plate is rectilinearly positionable between an extended position when the padlock is in the locked mode and a retracted position when the padlock is in the unlocked mode by the key mechanism as a result of rotational movement of the cam, and when the blocking plate is in the retracted position the shackle may be rotated about the long-leg of the shackle to remove the short-leg of the shackle from the locking hole and operate the padlock to the unlocked mode by the key mechanism.

According to this and other exemplary aspects of the present invention, the cylinder may include a square slot, and the cam further may include a square block configured to be received within the square slot of the cylinder so that rotational movement of the cylinder is transferred to the cam.

According to this and other exemplary aspects of the present invention, the blocking plate further may include a blocking-edge, when the blocking plate is in the extended position the blocking-edge is positioned in the arcuate opening of the locking hole to prevent movement of the short-leg of the shackle through the arcuate opening of the locking hole, and when the blocking plate is in the retracted position the blocking-edge is removed from the arcuate opening of the locking hole.

According to this and other exemplary aspects of the present invention, the long-leg of the shackle may include a protrusion extending therefrom for each clutch of the at least one clutches, and each clutch of the at least one clutches further may include a shackle hole configured to receive the long-leg of the shackle through the clutch, a top surface positioned within the shackle hole, a bottom surface positioned opposite the top surface and an opening gap extending from the top surface to the bottom surface and forming a passageway therebetween for passage of the protrusion of the long-leg of the shackle corresponding to the clutch at least partially through the clutch.

According to this and other exemplary aspects of the present invention, the padlock may also include a locking hole formed in the body and configured to at least partially surround the short-leg of the shackle when the padlock is in the locked mode, rectilinear movement of the long-leg of the shackle away from the body of the padlock is configured to remove the short-leg of the shackle from the locking hole when the padlock is operated to the unlocked mode by the combination mechanism, and the padlock is in the unlocked mode by the combination mechanism when a correct combination code has been set on all of the dials of the at least one dial and the opening gap of each clutch are aligned with each corresponding protrusion of the long-leg of the shackle allowing for movement of each protrusion from the corresponding bottom surface to the corresponding top surface of each corresponding clutch.

According to this and other exemplary aspects of the present invention, the long-leg of the shackle further may include a recode protrusion extending therefrom, when the padlock is in the unlocked mode by the combination mechanism the recode protrusion is configured for alignment with a notch formed in the body and insertion of the recode protrusion into the notch engages each protrusion of the long-leg of the shackle with the corresponding top surface of each corresponding clutch thereby causing separation of the extended fin of each clutch from the teeth of the corresponding dial, and the extended fin of each clutch is retained in a fin slot within the body.

According to this and other exemplary aspects of the present invention, the padlock may also include a recode indicator having a shackle receiving hole configured for receipt of the long-leg of the shackle, a spring loaded area configured for insertion in a shackle spring and a clutch contact surface, insertion of the recode protrusion into the notch and engagement of each protrusion of the long-leg of the shackle with the corresponding top surface of each corresponding clutch causes operative contact between the bottom surface of at least one clutch with the clutch contact surface and depression of the shackle spring, and depression of the shackle spring allows for at least partial extension of the spring loaded area of the recode indicator out of the body of the padlock.

According to this and other exemplary aspects of the present invention, the long-leg of the shackle further may include a reset protrusion extending therefrom, the key-mechanism indicator may include a spring-loaded area formed on one end thereof and a neck formed in the key-mechanism indicator, the padlock further may include a key-mechanism indicator spring configured for operative engagement with the spring-loaded area of the key-mechanism indicator to urge the key-mechanism indicator into the body of the padlock, the latch may include a spring assembled area configured for operative engagement with a latch spring, a tip extending from the spring assembled area and a tail slope extending from the latch opposite the tip, the tip is configured for a retaining engagement with the neck of the key-mechanism indicator so as to maintain extension of at least the portion of the key-mechanism indicator out of the body of the padlock when the padlock is operated to the unlocked mode by the key mechanism, and the reset protrusion is configured for operative engagement with the tail slope of the latch to urge the latch to compress the latch spring and disengage the tip from the neck of the key-mechanism indicator when the padlock is operated to the unlocked mode by the combination mechanism.

According to this and other exemplary aspects of the present invention, at least partial extension of the spring loaded area of the recode indicator out of the body of the padlock provides a visual indication the padlock has been operated to a reset mode, the in reset mode rotation of each dial is not transferred to the clutch corresponding to each of the at least one dials.

According to this and other exemplary aspects of the present invention, the body may include at least one recode channel formed therein integrally connected with the notch, the recode channel is configured for receipt and retention of the recode protrusion of the long-leg of the shackle within the body after the recode protrusion has been inserted through the notch, and when the recode protrusion is retained within the body by the recode channel separation of the extended fin of each clutch from the teeth of the corresponding dial is maintained.

According to this and other exemplary aspects of the present invention, the long-leg of the shackle further may include a reset protrusion extending therefrom, the key-mechanism indicator may include a spring-loaded area formed on one end thereof and a neck formed in the key-mechanism indicator, the padlock further may include a key-mechanism indicator spring configured for operative engagement with the spring-loaded area of the key-mechanism indicator to urge the key-mechanism indicator into the body of the padlock, the latch may include a spring assembled area configured for operative engagement with a latch spring, a tip extending from the spring assembled area and a tail slope extending from the latch opposite the tip, the tip is configured for a retaining engagement with the neck of the key-mechanism indicator so as to maintain extension of at least the portion of the key-mechanism indicator out of the body of the padlock when the padlock is operated to the unlocked mode by the key mechanism, and the reset protrusion is configured for operative engagement with the tail slope of the latch to urge the latch to compress the latch spring and disengage the tip from the neck of the key-mechanism indicator when the padlock is operated to the unlocked mode by the combination mechanism.

According to this and other exemplary aspects of the present invention, the long-leg of the shackle further may include a recode protrusion extending therefrom, when the padlock is in the unlocked mode by the combination mechanism the recode protrusion is configured for alignment with a notch formed in the body and insertion of the recode protrusion into the notch engages each protrusion of the long-leg of the shackle with the corresponding top surface of each corresponding clutch thereby causing separation of the extended fin of each clutch from the teeth of the corresponding dial, and the extended fin of each clutch is retained in a fin slot within the body.

According to this and other exemplary aspects of the present invention, the key-mechanism indicator may include a spring-loaded area formed on one end thereof and a neck formed in the key-mechanism indicator, the padlock further may include a key-mechanism indicator spring configured for operative engagement with the spring-loaded area of the key-mechanism indicator to urge the key-mechanism indicator into the body of the padlock, the latch may include a spring assembled area configured for operative engagement with a latch spring, a tip extending from the spring assembled area and a tail slope extending from the latch opposite the tip, the tip is configured for a retaining engagement with the neck of the key-mechanism indicator so as to maintain extension of at least the portion of the key-mechanism indicator out of the body of the padlock when the padlock is operated to the unlocked mode by the key mechanism, and the recode protrusion is configured for operative engagement with the tail slope of the latch to urge the latch to compress the latch spring and disengage the tip from the neck of the key-mechanism indicator when the padlock is operated to the unlocked mode by the combination mechanism.

According to this and other exemplary aspects of the present invention, when the padlock is in the unlocked mode by the combination mechanism the reset protrusion is configured for alignment with a notch formed in the body and insertion of the reset protrusion into the notch engages each protrusion of the long-leg of the shackle with the corresponding top surface of each corresponding clutch thereby causing separation of the extended fin of each clutch from the teeth of the corresponding dial, and the extended fin of each clutch is retained in a fin slot within the body.

According to this and other exemplary aspects of the present invention, the padlock may also include a locking hole formed in the body and configured to at least partially surround the short-leg of the shackle when the padlock is in the locked mode, rectilinear movement of the long-leg of the shackle away from the body of the padlock is configured to remove the short-leg of the shackle from the locking hole when the padlock is operated to the unlocked mode by the combination mechanism, and rotational movement of the shackle about the long-leg of the shackle is configured to remove the short-leg of the shackle from the locking hole when the padlock is operated to the unlocked mode by the key mechanism.

The reference numbers and corresponding elements are summarized below:

10 Padlock.
20 Front body
21 Locking hole
22 Long-leg shackle hole
23 Cylinder hole
24 Cam hole
25 Latch member cutout
26 Clutch hole
27 Dial hole
28 Recode indicator hole
29 Wall
20a Fin-slot
20b Recode channel
30 Rear body
31 Locking hole
32 Long-leg shackle hole
33 Cylinder hole
34 Cam hole
35 Key-mechanism indicator hole
36 Latch member cutout
37 Clutch hole
38 Dial hole
39 Recode indicator hole
30a Wall
30b Notch
30c Recode channel
30d Fin-slot
40 Cylinder
41 Square slot
50 Cam
51 Square block
52 Slope
53 Slope-wing
60 Blocking plate
61 Blocking-edge
62 Pin
70 Key-mechanism indicator
71 Spring loaded area
72 Neck
73 Bottom slope -continued

| |
|---|
| 80 Latch |
| 81 Spring assembled area |
| 82 Tip |
| 83 Tail-slope |
| 90 Clutch |
| 91 Extended Fin |
| 92 Opening-gap |
| 93 Shackle hole |
| 94 Top surface |
| 95 Bottom surface |
| 100 Dial |
| 101 Teeth |
| 102 Cutout |
| 110 Recode indicator |
| 111 Spring loaded area |
| 112 Large diameter |
| 113 Contact clutch surface |
| 114 Shackle hole receiving hole |
| 120 Shackle |
| 121 Short-leg-shackle |
| 122 Long-leg-shackle |
| 123 Protrusion |
| 124 Recode/Reset-Protrusion |
| 130 Dial Spring Plate |
| 140 Shackle Spring |
| 150 Latch spring |
| 160 Key-mechanism indicator spring. |
| 170 Key |

BRIEF DESCRIPTION OF THE DRAWINGS

For a fuller understanding of the nature and object of the present invention, reference should be had to the following detailed description taken in connection with the accompanying drawings, in which.

DETAILED DESCRIPTION

Figure 1A:
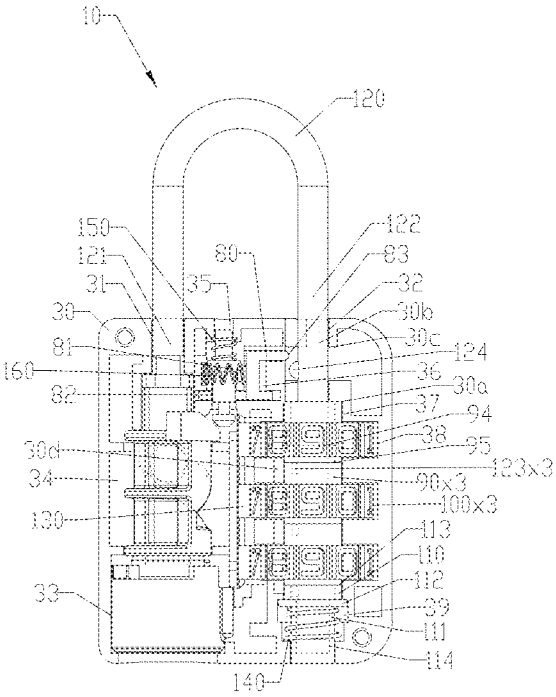
FIG. 1A is a front view of an exemplary padlock according to an aspect of the invention in a locked mode with an exemplary front body removed.

The present invention now will be described more fully hereinafter with reference to the accompanying figures, in which exemplary embodiments of the invention are shown. The invention may, however, be embodied in many different forms and should not be construed as limited to the embodiments set forth herein. Like reference numerals refer to like elements throughout.

Figure 1B:
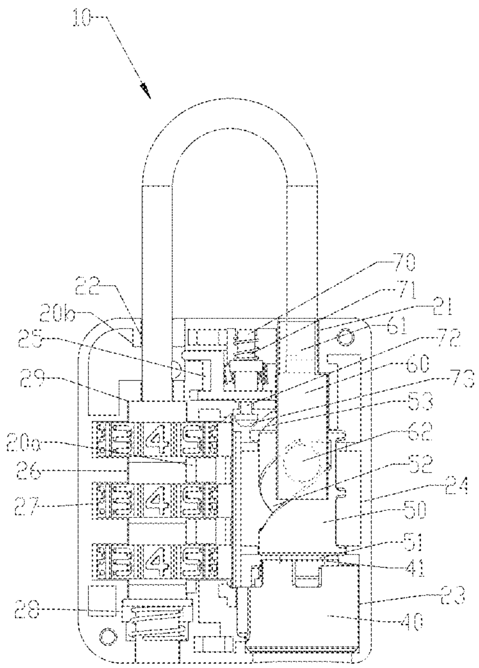
FIG. 1B is a rear view of the exemplary padlock with an exemplary rear body removed.
Figure 1C:
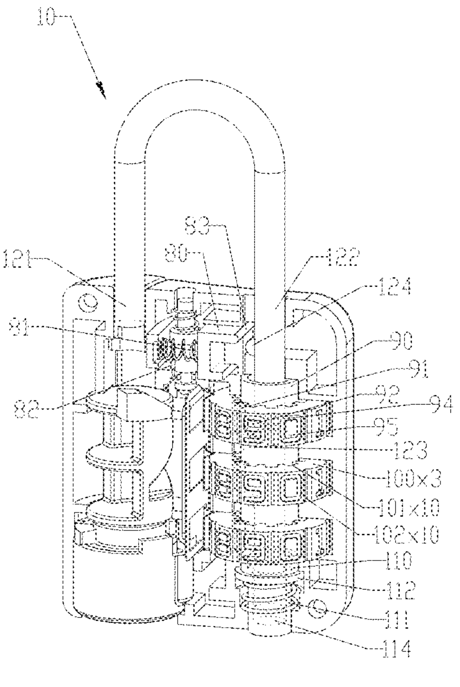
FIG. 1C is a perspective front view of the exemplary padlock with the exemplary front body removed.
Figure 1D:
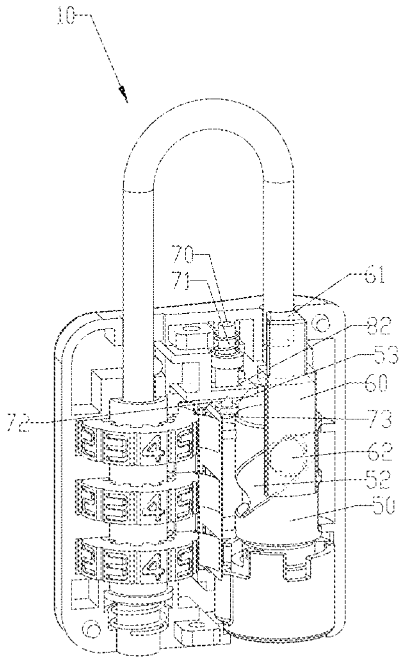
FIG. 1D is a perspective rear view of the exemplary padlock with the exemplary rear body removed.
Figure 13A:
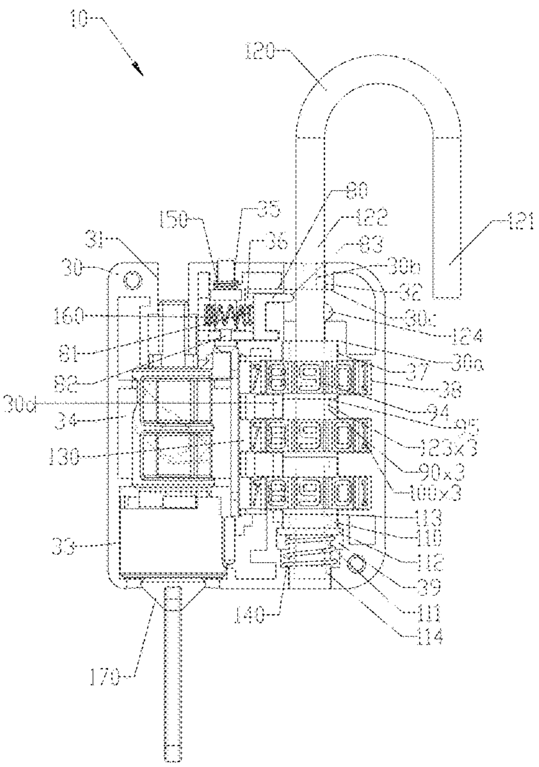
FIG. 13A is a front view of the exemplary padlock according to an aspect of the invention in an unlocked mode by a key mechanism with the exemplary front body removed.
Figure 13B:
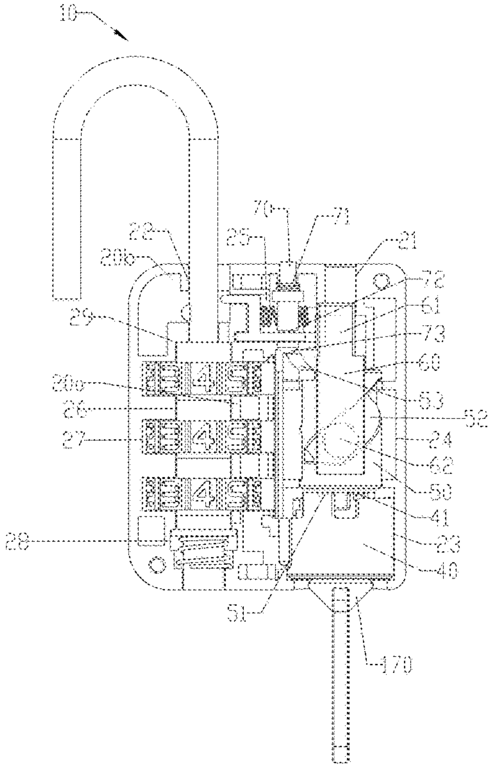
FIG. 13B is a rear view of the exemplary padlock with an exemplary rear body removed.
Figure 13C:
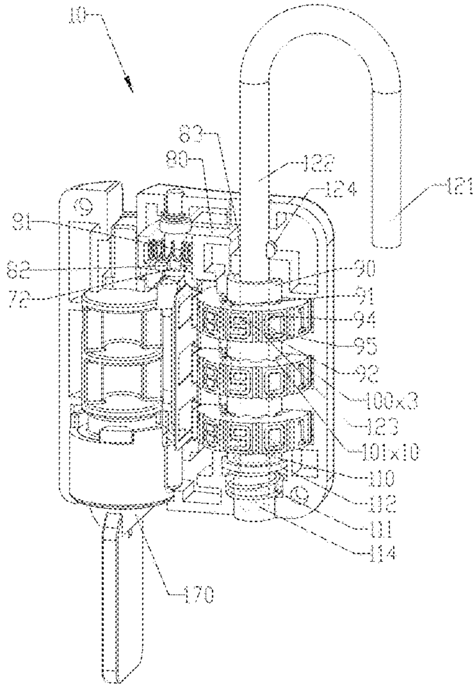
FIG. 13C is a perspective front view of the exemplary padlock with the exemplary front body removed.
Figure 13D:
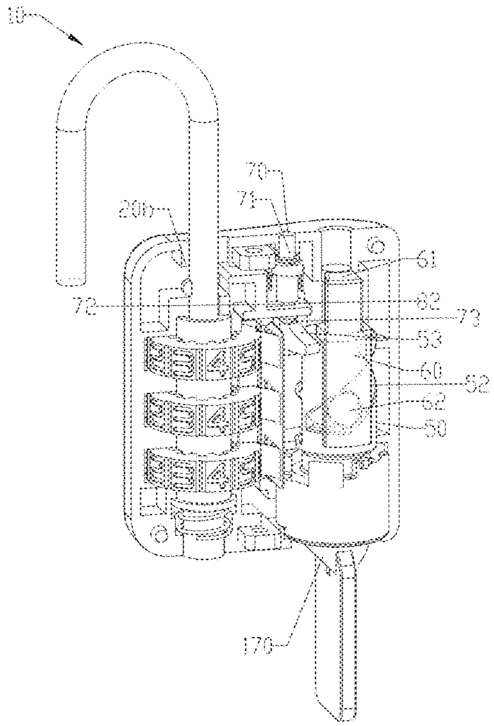
FIG. 13D is a perspective rear view of the exemplary padlock with the exemplary rear body removed.
Figure 14A:
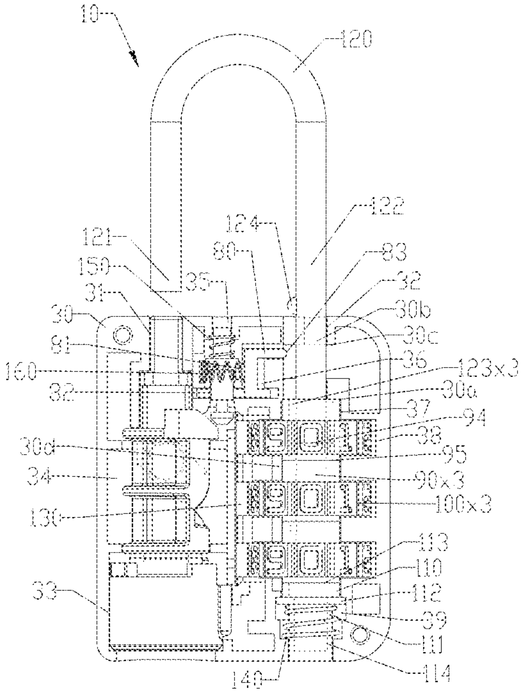
FIG. 14A is a front view of the exemplary padlock according to an aspect of the invention in an unlocked mode by a combination mechanism with the exemplary front body removed.
Figure 14B:
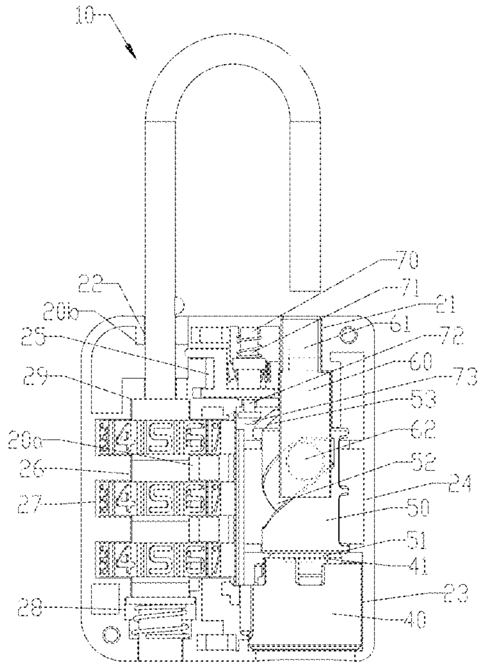
FIG. 14B is a rear view of the exemplary padlock with an exemplary rear body removed.
Figure 14C:
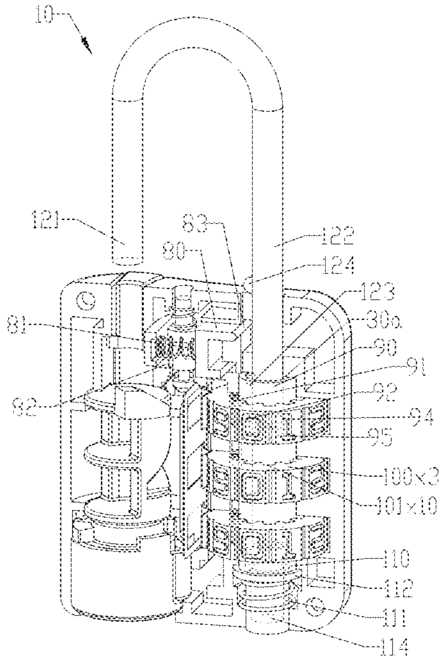
FIG. 14C is a perspective front view of the exemplary padlock with the exemplary front body removed.
Figure 14D:
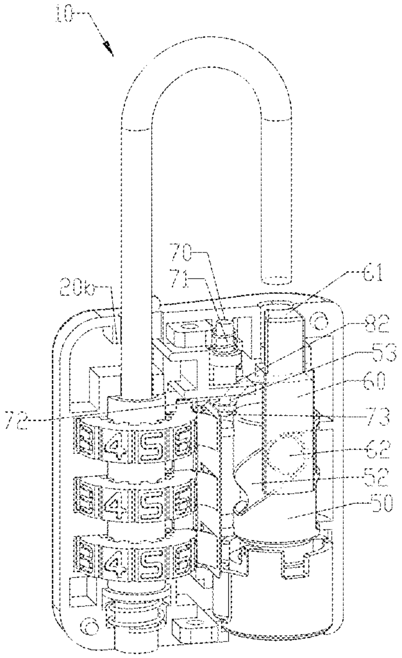
FIG. 14D is a perspective rear view of the exemplary padlock with the exemplary rear body removed.
Figure 15A:
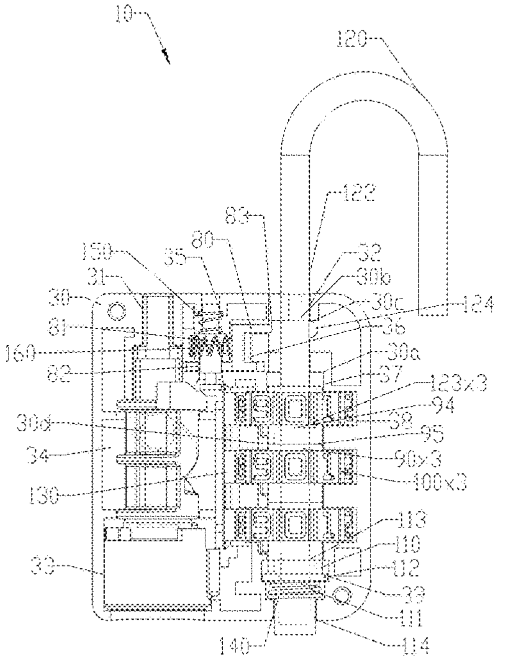
FIG. 15A is a front view of the exemplary padlock according to an aspect of the invention in a reset mode with the exemplary front body removed.
Figure 15B:
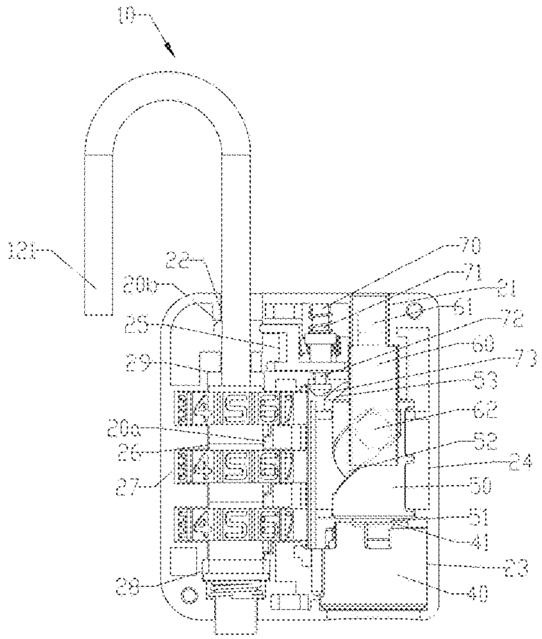
FIG. 15B is a rear view of the exemplary padlock with an exemplary rear body removed.
Figure 15C:
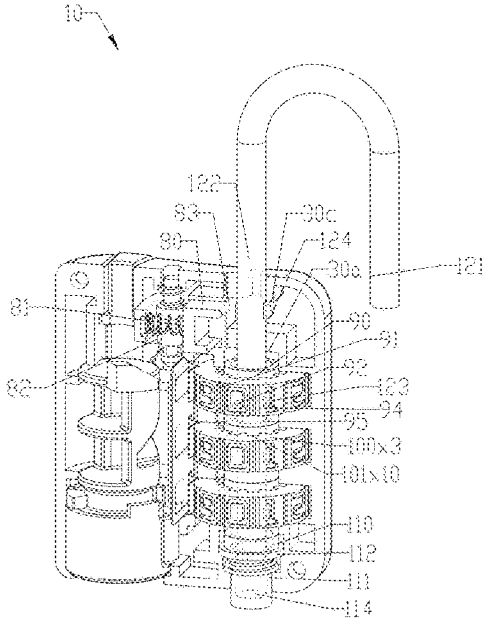
FIG. 15C is a perspective front view of the exemplary padlock with the exemplary front body removed.
Figure 15D:
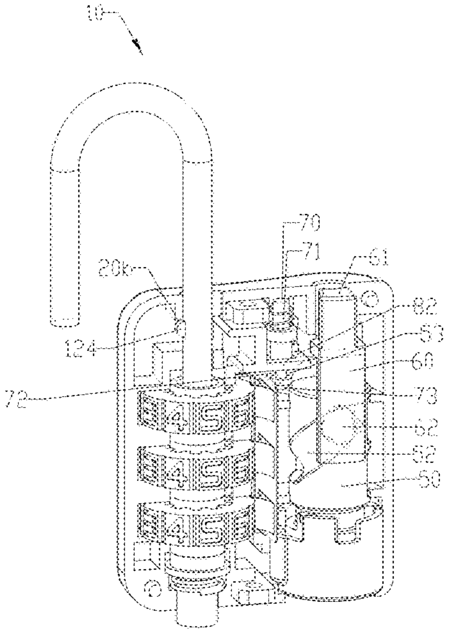
FIG. 15D is a perspective rear view of the exemplary padlock with the exemplary rear body removed.
Figure 16A:
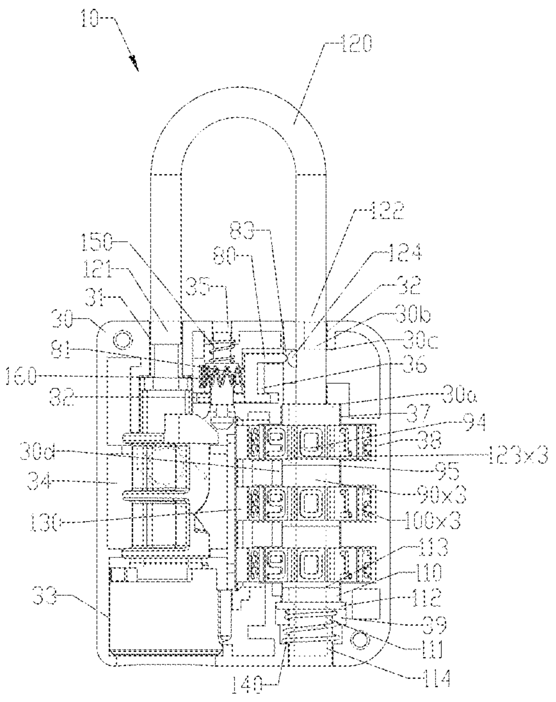
FIG. 16A is a front view of the exemplary padlock according to an aspect of the invention in a reset key mechanism indicator mode with the exemplary front body removed.
Figure 16B:
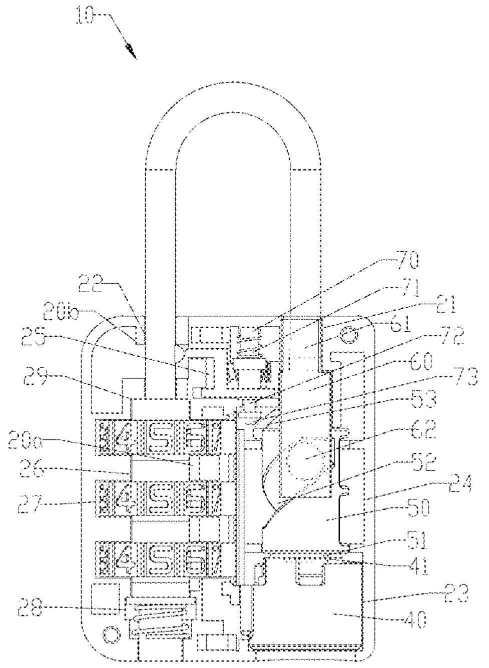
FIG. 16B is a rear view of the exemplary padlock with an exemplary rear body removed.
Figure 16C:
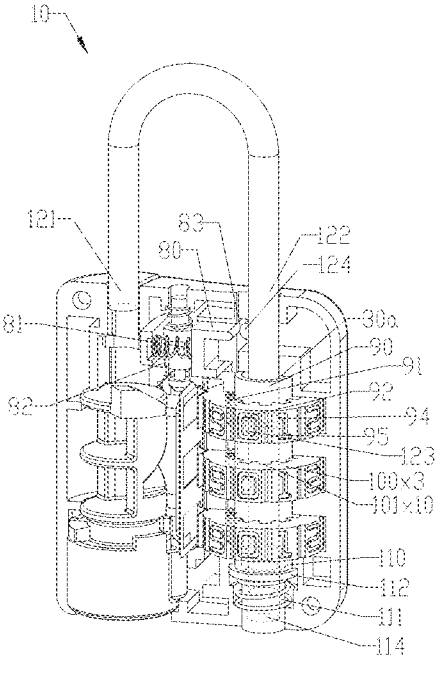
FIG. 16C is a perspective front view of the exemplary padlock with the exemplary front body removed.
Figure 16D:
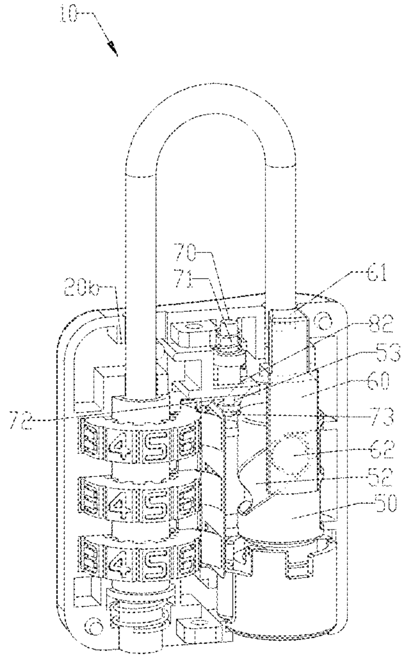
FIG. 16D is a perspective rear view of the exemplary padlock with the exemplary rear body removed.

Referring now to FIGS. 1A-1D, therein illustrated is an exemplary padlock, generally indicated by reference numeral 10 in FIGS. 1A-1D, 13A-13D, 14A-14D, 15A-15D and 16A-16D. The padlock 10 may be constructed from a front body 20 and a rear body 30 that may be combined together in order to form a housing for the components of the padlock 10. The padlock 10 may also include a shackle 120 configured for retention within the front body 20 and the rear body 30. The front body 20 of the padlock 10 may include a locking hole 21 positioned so as to be opposite a corresponding locking hole 31 of the rear body 30, and form an opening configured to receive and releasably retain a short-leg shackle 121 of the shackle 120. The front body 20 may also include a long-leg shackle hole 22 positioned so as to be opposite a long-leg shackle hole 32 of the rear body 30 and form an opening configured to receive and retain a long-leg shackle 122 of the shackle 120. Each of the front body 20 and the rear body 30 include a cylinder hole 23/33 configured and dimensioned to receive and retain a cylinder 40 within the padlock 10. The front body 20 and the rear body 30 may each further include a cam hole 24/34 configured and dimensioned to receive and retain a cam 50 operatively coupled to the cylinder 40 within the padlock 10. The front body 20 and the rear body 30 may each further include a latch member cutout 25/36 configured and dimensioned to receive and retain a cam latch 80 within the padlock 10. The rear body 30 may further include a key-mechanism indicator hole 35 configured and dimensioned to receive and retain a key-mechanism indicator 70 within the padlock 10. The front body 20 and the rear body 30 may also each include one or more clutch holes 26/37, one or more dial holes 27/38 and one or more fin-slots 20*a*/30*d*. The one or more clutch holes 26/37 are configured and dimensioned to each receive one of the one or more clutches 90 within the padlock 10, and the one or more dial holes 27/38 are configured and dimensioned to each receive one of the one or more dials 100 within the padlock 10. The one or more clutches 90 each include at least one extended-fin 91, and each extended-fin 91 configured to be received within a corresponding fin-slot 20*a*/30*d* of the one or more fin-slots 20*a*/30*d* when a correct combination code of the padlock 10 has been set on the one or more dials 100.

Figure 2:
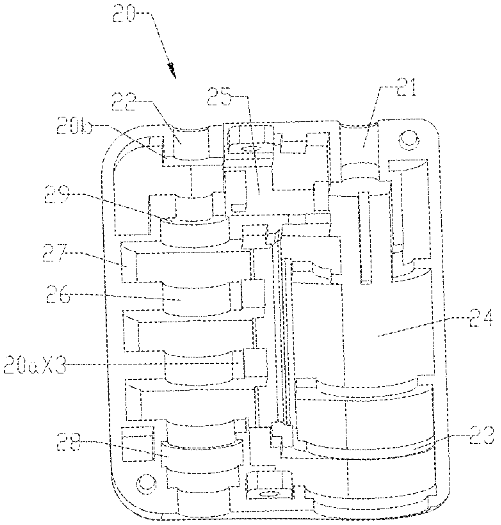
FIG. 2 is a perspective view of the exemplary front body that may be used with the exemplary padlock according to an aspect of the present invention.
Figure 3:
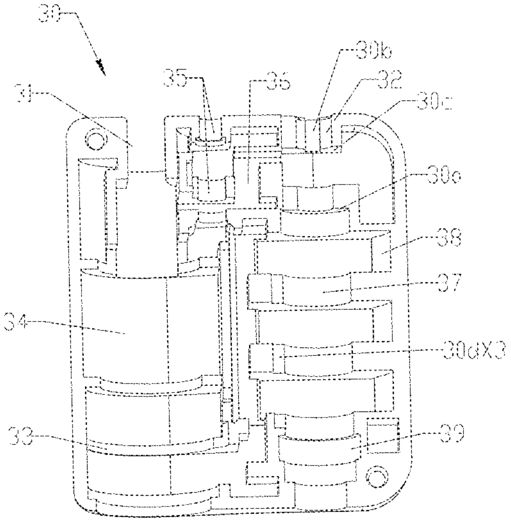
FIG. 3 is a perspective view of the exemplary rear body that may be used with the exemplary padlock according to an aspect of the present invention.
Figure 4:
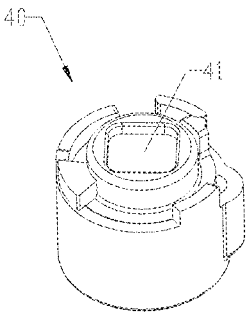
FIG. 4 is a perspective view of an exemplary cylinder that may be used with the exemplary padlock according to an aspect of the present invention.
Figure 5:
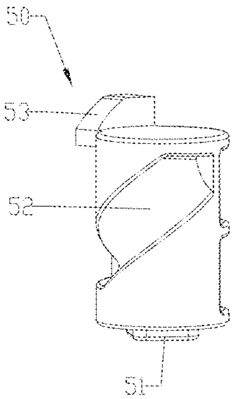
FIG. 5 is a perspective view of an exemplary cam that may be used with the exemplary padlock according to an aspect of the present invention.
Figure 6:
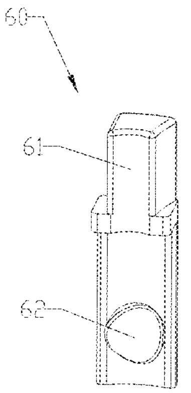
FIG. 6 is a perspective view of an exemplary blocking plate that may be used with the exemplary padlock according to an aspect of the present invention.
Figure 7:
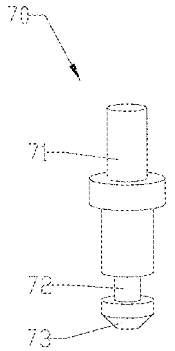
FIG. 7 is a perspective view of an exemplary key-mechanism indicator that may be used with the exemplary padlock according to an aspect of the present invention.
Figure 8:
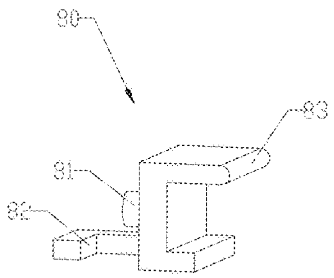
FIG. 8 is a perspective view of an exemplary latch that may be used with the exemplary padlock according to an aspect of the present invention.
Figure 9:
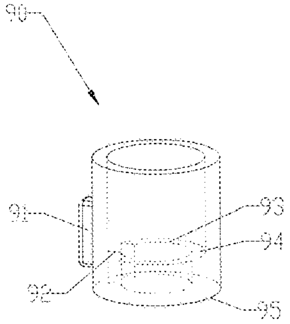
FIG. 9 is a perspective view of an exemplary clutch that may be used with the exemplary padlock according to an aspect of the present invention.
Figure 10:
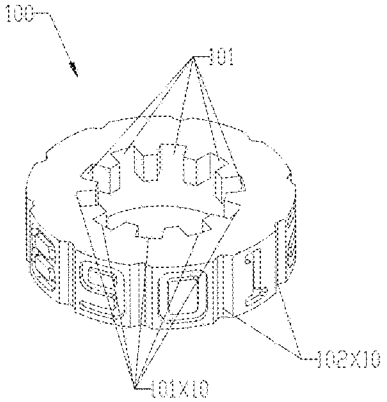
FIG. 10 is a perspective view of an exemplary dial that may be used with the exemplary padlock according to an aspect of the present invention.
Figure 11:
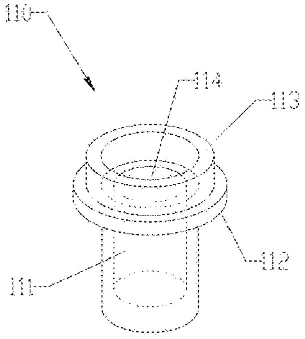
FIG. 11 is a perspective view of an exemplary recode indicator that may be used with the exemplary padlock according to an aspect of the present invention.
Figure 12:
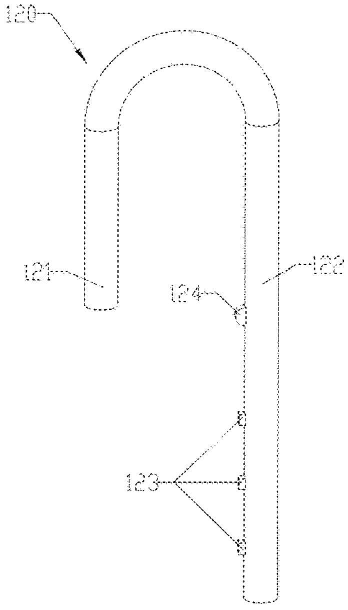
FIG. 12 is a perspective view of an exemplary shackle that may be used with the exemplary padlock according to an aspect of the present invention.

Still referring to FIGS. 1A-16D, each of the front body 20 and the rear body 30 of the padlock 10 may also each include a recode indicator hole 28/39 configured to allow a recode indicator 110 of the padlock 10 to extend at least partially out of the padlock 10. The recode indicator 110 may include a substantially cylindrical spring loaded area 111, a large diameter 112 extending circumferentially from the spring loaded area 111 and configured to separate a contact clutch surface 113 from the spring loaded area. The recode indicator 110 may also include a shackle hole receiving hole 114 configured to receive an end of the long-leg shackle 122. The spring loaded area 111 is configured to be received within shackle spring 140, and the shackle spring 140 is configured to engage with the larger diameter 112 to urge the recode indicator 110 in a direction into the padlock 10. The front body 20 and the rear body 30 may also each include a wall 29/30*a* configured to restrict upward movement of the one or more clutches 90 within the padlock 10. The wall 29/30*a* is configured and positioned so that an uppermost protrusion 123 of the one or more protrusions 123 of the shackle 120 contact the wall 29/30*a* when the padlock 10 has been operated to an unlocked mode via the combination mechanism in order to restrict further movement of the shackle 120 away from the front body 20 and the rear body 30. Likewise, the wall 29/30*a* may also be configured to restrict upward movement of the topmost clutch 90 of the one or more clutches 90. The front body 20 and the rear body 30 may also each include a recode channel 20*b*/30*c* configured to engage with a recode/reset protrusion 124 of the shackle 120. The recode channel 30*c* formed in the rear body 30 allows insertion of the recode/reset protrusion 124 into the padlock 10 after the padlock 10 has been operated to the unlocked mode by the combination mechanism.

Still referring to FIGS. 1A-16D, the cylinder 40 of the padlock 10 may include a square slot 41 configured to receive a square block 51 of the cam 50 so that when a correct cut key 170 is inserted into the cylinder 40 and rotated, rotational movement of the cylinder 40 is transferred to the cam 50. The cam 50 may further include a slope 52 formed therein and extending at an angle relative to the square block 51 along the periphery of the cam 50. The padlock 10 may further include a blocking plate 60 having a blocking edge 61 configured for positioning in the locking hole 31 of the rear body 30 in order to restrict and/or prevent rotational movement of the short-leg shackle 121 out of the locking hole 21/31. The blocking plate 60 may further include a pin 62 extending therefrom, and configured for engagement with the slope 52 of the cam 50 so that rotational movement of the cam 50 is transferred to rectilinear movement of the blocking plate 60 out of the locking hole 31 when the correct cut key 170 has been inserted and rotated in the cylinder 40. The cam 50 may also include a slope-wing 53 configured for engagement with a bottom slope 73 of the key-mechanism indicator 70. As the cam 50 is rotated by rotational movement of the correct cut key 170 in the cylinder 40, the slope-wing 53 engages with the bottom slope 73 of the key-mechanism indicator 70 to urge the key-mechanism indicator 70 against a key-mechanism spring 160 configured to urge the key-mechanism indicator 70 into a retracted position within the padlock 10. The key-mechanism spring 160 engages with a spring loaded area 71 of the key-mechanism indicator 70. As the cam 50 is rotated, the slope-wing 53 also rotates to urge the key-mechanism indicator 70 so that a neck 72 formed in the key-mechanism indicator 70 is engaged with a tip 82 of the latch 80. The latch 80 may also include a spring assembled area 81 configured for engagement with a latch spring 150. The latch spring 150 urges the tip 82 of the latch 80 into engagement with the neck 72 of the key-mechanism indicator 70 so that the key-mechanism spring 160 is compressed and the key-mechanism indicator 70 extends from the padlock 10. The latch 80 may also include a tail-slope 83 which is positioned and configured for engagement with the recode/reset protrusion 124 of the shackle 120. Each of the one or more dials 100 may have teeth 101 positioned along an interior perimeter of the dials 100, which teeth 101 are configured for engagement with the one or more extended-fins 91 of the one or more clutches 90 so that rotation of the dials 100 around the long-leg shackle 122 results in corresponding rotation of the clutches 90. The extended-fins 91 are assembled in the teeth 101 of the dials 100 so that turning of dials 100 will turn the clutches 90. Each of the dials 100 has one or more indicia, which may be in the form of numbers, symbols, letters, colors or the like, corresponding to each tooth of the teeth 101. For example, in the exemplary embodiment illustrated ten indicia in the form of the numbers 0-9 are illustrated, and each of the dials 100 has ten teeth 101. A dial spring plate 130 may be positioned in the padlock 10 in order to give an indication when a distinct indicia of the combination controlled mechanism has been selected as the dial spring plate 130 will engage with cutouts 102 on the dials 100 positioned between each indicia. Each of the clutches 90 has a substantially cylindrical configuration having a bottom surface 95. Within each of the clutches 90 is a shoulder forming a top surface 94, an opening gap 92 formed in the top surface 94, and a shackle hole 93 formed through the clutch 90. The long-leg shackle 122 of the shackle 120 includes one or more protrusions 123 extending therefrom, and each configured for engagement with the bottom surface 95 of one of the one or more clutches 90 when the padlock 10 is in a locked mode, or configured to pass through the opening gap 92 in one of the one or more clutches 90 when the padlock 10 is in the unlocked mode by the combination mechanism.

Referring now to FIGS. 1A-12, the locked mode of the padlock 10 will now be discussed. The padlock 10 contains the shackle 120 having the short-leg-shackle 121 of the shackle 120 of the padlock 10 may be controlled between a closed mode and an open mode by the key mechanism, which may be comprised of the cylinder 40, the came 50 and the blocking plate 60. In the closed mode of the short-leg-shackle 121 the padlock 10 is in the locked mode, and then the short-leg-shackle 121 is in the open mode by the key mechanism, the padlock 10 may be operated to the unlocked mode by the key mechanism. The long-leg-shackle 122 of the shackle 120 may be controlled by the combination mechanism, which may be comprised of the one or more clutches 90 and the one or more dials 100, to allow for operation of the padlock between the locked mode and the unlocked mode by the combination mechanism of the padlock 10. When the padlock 10 is in the locked mode, the shackle 120 will have no rectilinear movement away from the padlock 10, and the short-leg-shackle 121 is retained in the locking-hole 21/31 of the front/rear body 20/30. The short-leg shackle 121 is retained in the locking-hole 21/31 by the blocking plate 60 preventing rotation of the short-leg shackle 121 away from the locking-hole 21/31. As there is no correct cut key 170 inserted into the cylinder 40, the cam 50 cannot rotate, and the blocking plate 60 keeps the short-leg-shackle 121 in the closed mode and prevents the padlock 10 from operating to the unlocked mode by the key mechanism. Furthermore, when the padlock 10 is in the locked mode, at least one dial 100 is not set to the correct combination code, which results in at least one of the corresponding clutches 90 not having the opening-gap 92 aligned with the corresponding protrusion 123 of the long-leg shackle 122. Accordingly, the shackle 120 cannot be moved in a direction away from the padlock 10 in order to release the short-leg shackle 121 from the locking hole 21/31. In the locked mode, at least one protrusion 123 of the shackle 120 is not aligned with the opening-gap 92 of the clutch 90, and the shackle 120 cannot be lifted upward to operate the padlock 10 to the unlocked mode by the combination mechanism, because the bottom surface 95 of each clutch 90 corresponding to a dial 100 not containing the correct combination code restricts rectilinear movement of the long-leg-shackle 122.

In the locked mode, the correct cut key 170 is not present and therefore, the cylinder 40 can have no rotational movement. The cylinder 40 may be a pin-tumbler cylinder, a wafer cylinder or any other type of cylinder known in the art, and it is understood that when the correct cut key 170 is not inserted into the cylinder 40, the pins, wafers, or the like are not correctly aligned and inhibit rotational movement of the cylinder 40. The pin 62 of the blocking plate 60 is assembled onto the slope 52 of the cam 50. Since the cylinder 40 cannot rotate, the slope 52 of the cam 50 likewise has no rotational movement, and the pin 62 of the blocking plate 60 will be retained in place by the slope 52 of the cam 50. It is understood that the blocking plate 60 cannot have any rectilinear movement unless the cam 50 has rotational movement, and the blocking plate 60 is in the locked position. As the cylinder 40 has no movement, the cam 50 will also have no rotational movement as a result of engagement between the square slot 41 of the cylinder 40 and the square block 51 of the cam 50. When the blocking plate 60 in the locked position, the blocking edge 61 of the blocking plate 60 will block the path of the short-leg shackle 121 from moving out of the locking-hole 21/31 of the lock body 20/30, and the padlock 10 is in the locked mode.

Referring now to FIGS. 13A-13D, the operation of the padlock 10 to the unlocked mode by the key mechanism will now be discussed. Using the key mechanism to unlock the padlock 10, the correct cut key 170 is inserted into the cylinder 40, and rotated so that the cam 50 will rotate in the same manner as the cylinder 40 due to the operative coupling of the square slot 41 with the square block 51 of the cam 50. As the cylinder rotates 40, the cam 50 rotates, and the slope-wing 53 of the cam 50 will contact the bottom slope 73 of the key-mechanism indicator 70. The slope-wing 53 will push the bottom slope 73 of the key-mechanism indicator 70 upward, and the key-mechanism indicator 70 will also be pushed upward. As the key-mechanism indicator 70 travels upward, the neck 72 of the key-mechanism indicator 70 algins with the tip 82 of the latch 80. The latch spring 150 will push the tip 82 of the latch 80 toward the neck 72 of the key-mechanism indicator 70 so that the tip 82 becomes engaged with the neck 72. The key-mechanism indicator 70 will not be able to travel downward in such engaged position, and the key-mechanism indicator 70 will remain extended from the padlock 10. In this manner, the padlock 10 provides a visual indication that the padlock 10 has been opened by the correct cut key 170, for example, as a result of baggage inspection by an official inspector at an airport. To operate the padlock 10 to the unlocked mode by the key mechanism, the cam 50 is rotated as a result of rotation of the correct cut key 170 in the cylinder, and rotation of the cam 50 will be transferred to rectilinear movement of the blocking plate 60 due to the interaction of the slope 52 of the cam 50 with the pin 62 of the blocking plate 60. The pin 62 of the blocking plate 60 is configured to travel along the slope 52 of the cam 50, so as the cam 50 is rotated the pin 62 retains its location relative to the slope 52 and the position of the blocking plate 60 relative to the cam 50 is adjusted depending upon the location of the pin 62 along the slope 52 of the cam 50. As the blocking plate 60 becomes retracted relative to the cam 50, the blocking-edge 61 of the blocking-plate 60 moves away from the locking-hole 21/31 of the body 20/30. The short-leg-shackle 121 of the padlock 10 can be operated to the open mode by rotating the short-leg-shackle 121 out of the locking-hole 21/31 of the body 20/30 and thereby operating the padlock 10 to the unlocked mode by the key mechanism. If the user wants to position the short-leg-shackle 121 of the shackle 120 back into the closed mode, and return the padlock 10 to the locked mode, the user can rotate the short-leg-shackle 121 of the shackle 120 to the locking-hole 21/31 of the body 20/30, and use the correct cut key 170 to rotate the cylinder 40 to the locked position by counter rotating the cylinder 40, and then the slope 52 of the cam 50 will drag the pin 62 of the blocking-plate 60 upward causing extension of the blocking plate 60 relative to the cam 50. As the blocking plate 60 is operated to its original position relative to the cam 50, the blocking-edge 61 of the blocking plate 60 will block the locking hole 21/31 of the body 20/30. The user can withdraw the key 170. Therefore, the short-leg 121 of the shackle 120 will be in the closed mode, and the padlock 10 will be in the locked mode.

Referring now to FIGS. 14A-14D and 16A-16D, operation of the padlock 10 to the unlocked mode by the combination mechanism, and resetting of the key-mechanism indicator 70 will now be discussed. When using the combination mechanism to operate the padlock 10 to the unlocked mode by the combination mechanism, the fins 91 of each of the clutches 90 are fully engaged with the teeth 101 of the corresponding dials 100. The user will algin dials 100 to the correct combination code and the opening-gap 92 of each clutch 90 will algin to the corresponding protrusion 123 on the long-leg shackle 122 of the shackle 120. Each of the clutches 90 contains a shackle hole 93 to receive the long-leg shackle 122. The dial spring plate 130 engages with the cutout 102 of the dial 100 to make sure each dial 100 contains a ratchet feeling to make sure the dial 100 will have a feeling for each indicia on the dial 100. When all of the protrusions 123 on the long-leg shackle 122 are aligned with the corresponding opening-gaps 92 there is nothing to block the protrusions 123 of the shackle 120, and the shackle 120 may have rectilinear movement within the body 20/30 of the padlock 10. The protrusions 123 are no longer blocked by the bottom surface 95 of the corresponding clutch 90, and the shackle 120 can move in a direction away from the body 20/30 so that the short-leg 121 of the shackle 120 may be moved away from the locking-hole 21/31 of the lock body 20/30 to the open mode. The shackle 120 can be moved away from the lock body 20/30 until the uppermost protrusion 123 on the long-leg-shackle 122 contacts the wall 29/30*a* of the lock body 20/30. Once the shackle 120 is operated to the open mode then the shackle 120 will be free to rotate about the long-leg shackle 122. To position the padlock 10 into the locked mode, the user can push the shackle 120 back towards the padlock 10 such that the short-leg 121 will be reinserted into the locking-hole 21/31 of the lock body 20/30. The blocking-edge 61 of the blocking plate 60 will prevent the short-leg 121 of the shackle 120 from rotating away from the locking hole 21/31, because the key lock mechanism is in the locked position then the blocking plate 60 will remain in locked position. This will make the blocking-plate 60 restrict the shackle 120 from rotating to the open mode. As the shackle 120 is in the locked position then the protrusions 123 of the long-leg-shackle 122 will be positioned below the corresponding bottom surfaces 95 of each of the clutches 90. The user can then scramble the dials 100 so that the dials 100 are no longer set to the correct combination code, and the fins 91 of each of the one or more clutches 90 will rotate in the same manner such that the opening-gaps 92 of the clutches 90 will not align with the corresponding protrusions 123 of the long-leg-shackle 122 of the shackle 120. In such case, shackle 120 will no longer be able to be pulled away from the padlock 10, and the padlock 10 is now returned to the locked mode.

Referring more specifically to FIGS. 16A-16D, in order to reset the key-mechanism indicator 70, the user operates the padlock 10 to the unlocked mode by the combination mechanism as discussed above. Then the user pulls the shackle 120 upward so that the recode/reset protrusion 124 of the shackle 120 will contact the tail-slope 83 of the latch 80. The contact of the recode/reset-protrusion 124 and the tail-slope 83 will make the latch 80 move leftward (an opposition of the spring force of the latch spring 150), and the tip 82 of the latch 80 will disengage from the neck 72 of the key-mechanism indicator 70. Then the key-mechanism indicator spring 160 engaged with the spring load area 71 of the key-mechanism indicator 70 will push the indicator 70 down back to the original position retracted and hidden in the lock body 20/30 of the padlock 10.

Referring now to FIGS. 15A-15D, the reset mode of the padlock 10 will now be discussed in which the correct combination code for the combination mechanism can be changed and/or reset. In the reset mode, the user operates the padlock 10 to the unlocked mode by the combination mechanism as discussed above with respect to FIGS. 14A-14D. As the shackle 120 is pulled upward, the user can turn the shackle 120 ninety (90) degrees such that the recode/reset-protrusion 124 will align to the notche 30*b* of the rear body 30 such that shackle 120 can be pushed downward so that each of the protrusions 123 of the shackle 120 will push the top surfaces 94 of each of the the clutches 90 downward. As the user pushes the shackle 120 completely downward, the recode/reset-protrusion 124 of the shackle 120 would be able to turn the recode/reset-protrusion 124 to the recode channel 20*b*/30*c* of the lock body 20/30. The recode channel 20*b*/30*c* will only allow the recode/reset-protrusion 124 to engage and disallow the shackle 120 from having upward movement. The recode channel 20*b*/30*c* allows the user to have both hands free without further requiring the user to keep pushing the shackle 120 downward for the entire reset process. As the set of clutches 90 will be pushed downward, the fins 91 on each of the clutches 90 will disengage from the teeth 101 of the corresponding dials 100. The user can rotate the dials 100 and the clutches 90 will not rotate. The opening-gap 92 of the clutch 90 will maintain the same direction such that after setting a new correct combination code the opening-gap 92 will aligns back to the protrusion 123 of the shackle 120. In addition, as a result of engagement with the long-leg shackle 122, the recode indicator 110 has been pushed downward and is being extended out of the lock body 20/30 to indicate to the user that the padlock 10 is in the reset mode. The user can rotate the dials 100 to the desired new correct combination code, because the extended fin 91 of each of the clutches 90 have engaged with the fin-slot 20*a*/30*d* of the lock body 20/30, so that rotation of the dials 100 to the new correct combination code does not also transfer rotation to the clutches 90 as the dials 100 have been disengaged from the corresponding clutches 90. After setting the new correct combination code, the user can rotate the shackle protrusion 123 ninety (90) degrees such that the recode/reset-protrusion 124 of the shackle 120 will turn away from the recode channel 20*b*/30*c* of the lock body 20/30. Then the shackle spring 140 is assembled in the spring-loaded area 111 of the recode indicator 110 will push the recode indicator 110 upward and the set of clutches 90 will move upward in the same direction. The extended fin 91 of the clutches 90 will engage back with the teeth 101 of the corresponding dials 100. The recode indicator 110 will be pushed upward until the large diameter 112 of the recode indicator 110 contacts the top of the recode indicator hole 28/39 of the lock body, and the contact clutch surface 113 will push the bottom most clutch 90 upward and the topmost clutch 90 will also contact the wall 29/30*a* of the lock body 20/30. The recode indicator 110 contains a long-leg shackle hole receiving hole 114 to receive the long leg 122 of the shackle 120. To operate the padlock 10 to the locked mode after resetting the correct combination code, the user can place the short-leg 121 of the shackle 120 into the locking-hole 21/31 of the body 20/30 and scramble the dials 100 such that the opening-gaps 92 of the clutches 90 are away from the protrusions 123 of the shackle 120.

It will thus be seen that the objects set forth above, among those made apparent from the preceding description, are efficiently attained and, since certain changes may be made in the above article without departing from the scope of this invention, it is intended that all matter contained in this disclosure or shown in the accompanying drawings, shall be interpreted, as illustrative and not in a limiting sense. It is to be understood that all of the present figures, and the accompanying narrative discussions of corresponding embodiments, do not purport to be completely rigorous treatments of the invention under consideration. It is to be understood that the above-described arrangements are only illustrative of the application of the principles of the present invention. Numerous modifications and alternative arrangements may be devised by those skilled in the art without departing from the scope of the present invention.

What is claimed is:

1. A padlock, comprising:

a body configured to house a combination mechanism and a key mechanism, the combination mechanism configured to allow operation of the padlock from a locked mode to an unlocked mode by the combination mechanism, and the key mechanism configured to allow operation of the padlock from the locked mode to an unlocked mode by the key mechanism, a shackle having a short-leg and a long-leg, wherein the long-leg is configured for retention in the body and for rectilinear and rotational movement relative to the body of the padlock, a key mechanism indicator configured to at least partially extend out of the body of the padlock when the padlock is operated to the unlocked mode by the key mechanism, and a latch configured for operative engagement with the key mechanism indicator to retain the key mechanism indicator at least partially extended out of the body of the padlock until the padlock has been operated from the locked mode to the unlocked mode by the combination mechanism;

wherein the key mechanism comprises a cylinder configured for receipt of a correct cut key and a cam configured for operative engagement with the cylinder such that rotation of the cylinder is transferred to the cam, wherein the cam comprises a cam slope formed therein, and wherein the padlock further comprises a blocking plate having a pin extending therefrom and configured for operative engagement with the cam slope of the cam such that rotational movement of the cam is translated to rectilinear movement of the blocking plate.

2. The padlock according to claim 1, wherein the combination mechanism comprises at least one dial having a plurality of indicia thereon, and at least one clutch configured for operative engagement with the at least one dial such that rotation of each of the at least one dial is transferred to the corresponding at least one clutch, wherein each dial of the at least one dial comprises a plurality of teeth, and each clutch of the at least one clutch comprises an extended fin configured for operative engagement with the plurality of teeth of the corresponding dial from the at least one dial.

3. The padlock according to claim 2, wherein the long-leg of the shackle comprises a protrusion extending therefrom for each clutch of the at least one clutches, and wherein each clutch of the at least one clutches further comprises a shackle hole configured to receive the long-leg of the shackle through the clutch, a top surface positioned within the shackle hole, a bottom surface positioned opposite the top surface and an opening gap extending from the top surface to the bottom surface and forming a passageway therebetween for passage of the protrusion of the long-leg of the shackle corresponding to the clutch at least partially through the clutch.

4. The padlock according to claim 3, further comprising a locking hole formed in the body and configured to at least partially surround the short-leg of the shackle when the padlock is in the locked mode, wherein rectilinear movement of the long-leg of the shackle away from the body of the padlock is configured to remove the short-leg of the shackle from the locking hole when the padlock is operated to the unlocked mode by the combination mechanism, and wherein the padlock is in the unlocked mode by the combination mechanism when a correct combination code has been set on all of the dials of the at least one dial and the opening gap of each clutch are aligned with each corresponding protrusion of the long-leg of the shackle allowing for movement of each protrusion from the corresponding bottom surface to the corresponding top surface of each corresponding clutch.

5. The padlock according to claim 4, wherein the long-leg of the shackle further comprises a recode protrusion extending therefrom, wherein when the padlock is in the unlocked mode by the combination mechanism the recode protrusion is configured for alignment with a notch formed in the body and insertion of the recode protrusion into the notch engages each protrusion of the long-leg of the shackle with the corresponding top surface of each corresponding clutch thereby causing separation of the extended fin of each clutch from the teeth of the corresponding dial, and wherein the extended fin of each clutch is retained in a fin slot within the body.

6. The padlock according to claim 5, further comprising a recode indicator having a shackle receiving hole configured for receipt of the long-leg of the shackle, a spring loaded area configured for insertion in a shackle spring and a clutch contact surface, wherein insertion of the recode protrusion into the notch and engagement of each protrusion of the long-leg of the shackle with the corresponding top surface of each corresponding clutch causes operative contact between the bottom surface of at least one clutch with the clutch contact surface and depression of the shackle spring, and wherein depression of the shackle spring allows for at least partial extension of the spring loaded area of the recode indicator out of the body of the padlock.

7. The padlock according to claim 6, wherein at least partial extension of the spring loaded area of the recode indicator out of the body of the padlock provides a visual indication the padlock has been operated to a reset mode, wherein the in reset mode rotation of each dial is not transferred to the clutch corresponding to each of the at least one dials.

8. The padlock according to claim 5, wherein the body comprises at least one recode channel formed therein integrally connected with the notch, wherein the recode channel is configured for receipt and retention of the recode protrusion of the long-leg of the shackle within the body after the recode protrusion has been inserted through the notch, and wherein when the recode protrusion is retained within the body by the recode channel separation of the extended fin of each clutch from the teeth of the corresponding dial is maintained.

9. The padlock according to claim 5, wherein the long-leg of the shackle further comprises a reset protrusion extending therefrom, wherein the key-mechanism indicator comprises a spring-loaded area formed on one end thereof and a neck formed in the key-mechanism indicator, wherein the padlock further comprises a key-mechanism indicator spring configured for operative engagement with the spring-loaded area of the key-mechanism indicator to urge the key-mechanism indicator into the body of the padlock, wherein the latch comprises a spring assembled area configured for operative engagement with a latch spring, a tip extending from the spring assembled area and a tail slope extending from the latch opposite the tip, wherein the tip is configured for a retaining engagement with the neck of the key-mechanism indicator so as to maintain extension of at least the portion of the key-mechanism indicator out of the body of the padlock when the padlock is operated to the unlocked mode by the key mechanism, and wherein the reset protrusion is configured for operative engagement with the tail slope of the latch to urge the latch to compress the latch spring and disengage the tip from the neck of the key-mechanism indicator when the padlock is operated to the unlocked mode by the combination mechanism.

10. The padlock according to claim 5, wherein the key-mechanism indicator comprises a spring-loaded area formed on one end thereof and a neck formed in the key-mechanism indicator, wherein the padlock further comprises a key-mechanism indicator spring configured for operative engagement with the spring-loaded area of the key-mechanism indicator to urge the key-mechanism indicator into the body of the padlock, wherein the latch comprises a spring assembled area configured for operative engagement with a latch spring, a tip extending from the spring assembled area and a tail slope extending from the latch opposite the tip, wherein the tip is configured for a retaining engagement with the neck of the key-mechanism indicator so as to maintain extension of at least the portion of the key-mechanism indicator out of the body of the padlock when the padlock is operated to the unlocked mode by the key mechanism, and wherein the recode protrusion is configured for operative engagement with the tail slope of the latch to urge the latch to compress the latch spring and disengage the tip from the neck of the key-mechanism indicator when the padlock is operated to the unlocked mode by the combination mechanism.

11. The padlock according to claim 4, wherein the long-leg of the shackle further comprises a reset protrusion extending therefrom, wherein the key-mechanism indicator comprises a spring-loaded area formed on one end thereof and a neck formed in the key-mechanism indicator, wherein the padlock further comprises a key-mechanism indicator spring configured for operative engagement with the spring-loaded area of the key-mechanism indicator to urge the key-mechanism indicator into the body of the padlock, wherein the latch comprises a spring assembled area configured for operative engagement with a latch spring, a tip extending from the spring assembled area and a tail slope extending from the latch opposite the tip, wherein the tip is configured for a retaining engagement with the neck of the key-mechanism indicator so as to maintain extension of at least the portion of the key-mechanism indicator out of the body of the padlock when the padlock is operated to the unlocked mode by the key mechanism, and wherein the reset protrusion is configured for operative engagement with the tail slope of the latch to urge the latch to compress the latch spring and disengage the tip from the neck of the key-mechanism indicator when the padlock is operated to the unlocked mode by the combination mechanism.

12. The padlock according to claim 11, wherein the long-leg of the shackle further comprises a recode protrusion extending therefrom, wherein when the padlock is in the unlocked mode by the combination mechanism the recode protrusion is configured for alignment with a notch formed in the body and insertion of the recode protrusion into the notch engages each protrusion of the long-leg of the shackle with the corresponding top surface of each corresponding clutch thereby causing separation of the extended fin of each clutch from the teeth of the corresponding dial, and wherein the extended fin of each clutch is retained in a fin slot within the body.

13. The padlock according to claim 11, wherein when the padlock is in the unlocked mode by the combination mechanism the reset protrusion is configured for alignment with a notch formed in the body and insertion of the reset protrusion into the notch engages each protrusion of the long-leg of the shackle with the corresponding top surface of each corresponding clutch thereby causing separation of the extended fin of each clutch from the teeth of the corresponding dial, and wherein the extended fin of each clutch is retained in a fin slot within the body.

14. The padlock according to claim 1, wherein the cam further comprises a slope-wing extending therefrom, and the key-mechanism indicator comprises a spring-loaded area formed on one end thereof, a bottom slope formed on an end of the key-mechanism indicator opposite the spring-loaded area, and a neck formed in the key-mechanism indicator disposed between the spring-loaded area and the bottom slope, wherein the padlock further comprises a key-mechanism indicator spring configured for operative engagement with the spring-loaded area of the key-mechanism indicator to urge the key-mechanism indicator into the body of the padlock, and wherein the slope-wing is configured for operative engagement with the bottom slope of the key-mechanism indicator such that rotation of the cam causes compression of the key-mechanism indicator spring and extension of at least a portion of the key-mechanism indicator out of the body of the padlock.

15. The padlock according to claim 14, wherein the latch comprises a spring assembled area configured for operative engagement with a latch spring and a tip extending from the spring assembled area, wherein the tip is configured for a retaining engagement with the neck of the key-mechanism indicator so as to maintain extension of at least the portion of the key-mechanism indicator out of the body of the padlock when the padlock is operated to the unlocked mode by the key mechanism.

16. The padlock according to claim 1, further comprising a locking hole formed in the body and configured to at least partially surround the short-leg of the shackle when the padlock is in the locked mode, wherein the locking hole has an arcuate opening formed therein configured for receipt of at least a portion of the blocking plate when the padlock is in the locked mode, wherein the blocking plate is rectilinearly positionable between an extended position when the padlock is in the locked mode and a retracted position when the padlock is in the unlocked mode by the key mechanism as a result of rotational movement of the cam, and wherein when the blocking plate is in the retracted position the shackle may be rotated about the long-leg of the shackle to remove the short-leg of the shackle from the locking hole and operate the padlock to the unlocked mode by the key mechanism.

17. The padlock according to claim 16, wherein the blocking plate further comprises a blocking-edge, wherein when the blocking plate is in the extended position the blocking-edge is positioned in the arcuate opening of the locking hole to prevent movement of the short-leg of the shackle through the arcuate opening of the locking hole, and wherein when the blocking plate is in the retracted position the blocking-edge is removed from the arcuate opening of the locking hole.

18. The padlock according to claim 1, wherein the cylinder comprises a square slot, and the cam further comprises a square block configured to be received within the square slot of the cylinder so that rotational movement of the cylinder is transferred to the cam.

19. The padlock according to claim 1, further comprising a locking hole formed in the body and configured to at least partially surround the short-leg of the shackle when the padlock is in the locked mode, wherein rectilinear movement of the long-leg of the shackle away from the body of the padlock is configured to remove the short-leg of the shackle from the locking hole when the padlock is operated to the unlocked mode by the combination mechanism, and wherein rotational movement of the shackle about the long-leg of the shackle is configured to remove the short-leg of the shackle from the locking hole when the padlock is operated to the unlocked mode by the key mechanism.

* * * * *